United States Patent
Hampton

(10) Patent No.: US 11,090,987 B1
(45) Date of Patent: Aug. 17, 2021

(54) TIRE PRESSURE MONITOR CAP

(71) Applicant: Travis Hampton, Ayr, NE (US)

(72) Inventor: Travis Hampton, Ayr, NE (US)

(*) Notice: Subject to any disclaimer, the term of this patent is extended or adjusted under 35 U.S.C. 154(b) by 159 days.

(21) Appl. No.: 16/269,729

(22) Filed: Feb. 7, 2019

(51) Int. Cl.
B60C 23/00 (2006.01)
B60C 23/04 (2006.01)

(52) U.S. Cl.
CPC ........ B60C 23/0496 (2013.01); B60C 23/004 (2013.01); B60C 23/0408 (2013.01); B60C 23/0493 (2013.01)

(58) Field of Classification Search
CPC .............. B60C 23/0496; B60C 23/004; B60C 23/0408; B60C 23/0493
See application file for complete search history.

(56) References Cited

U.S. PATENT DOCUMENTS

| 217,595 | A | 7/1879 | Edleblute | |
|---|---|---|---|---|
| 6,817,235 | B2 | 11/2004 | Sapir | |
| 7,086,272 | B2* | 8/2006 | Wu | G01L 17/00 73/1.59 |
| 7,348,878 | B2* | 3/2008 | Fogelstrom | B60C 23/005 340/442 |
| 7,667,583 | B2* | 2/2010 | Petrucelli | B60C 23/0496 340/442 |
| 8,618,925 | B2 | 12/2013 | Petrucelli et al. | |
| 9,242,517 | B2 | 1/2016 | Hsiao | |
| 2005/0274166 | A1* | 12/2005 | Wu | G01L 17/00 73/1.63 |
| 2007/0069877 | A1* | 3/2007 | Fogelstrom | B60C 23/0408 340/442 |
| 2007/0193349 | A1* | 8/2007 | Petrucelli | B60C 23/0408 73/146.8 |

* cited by examiner

Primary Examiner — Jamel E Williams
(74) Attorney, Agent, or Firm — Sanchelima & Associates, P.A.; Christian Sanchelima

(57) ABSTRACT

A tire pressure monitor cap for monitoring and notifying tire pressure is disclosed. The tire pressure monitor cap comprises a housing and a pressure gauge provided in the housing. The pressure gauge comprises a pressure sensor used for measuring air pressure. The tire pressure monitor cap comprises a microprocessor provided in the housing. The microprocessor is communicatively coupled to the pressure sensor. The tire pressure monitor cap comprises a transceiver communicatively coupled to the microprocessor. The tire pressure monitor cap is coupled to a valve stem assembly. The valve stem assembly is provided in a tire. The pressure sensor monitors tire pressure and communicates to the microprocessor. The microprocessor is configured to notify an electronic device or a dashboard via the transceiver when tire pressure reaches below a predetermined threshold value.

11 Claims, 4 Drawing Sheets

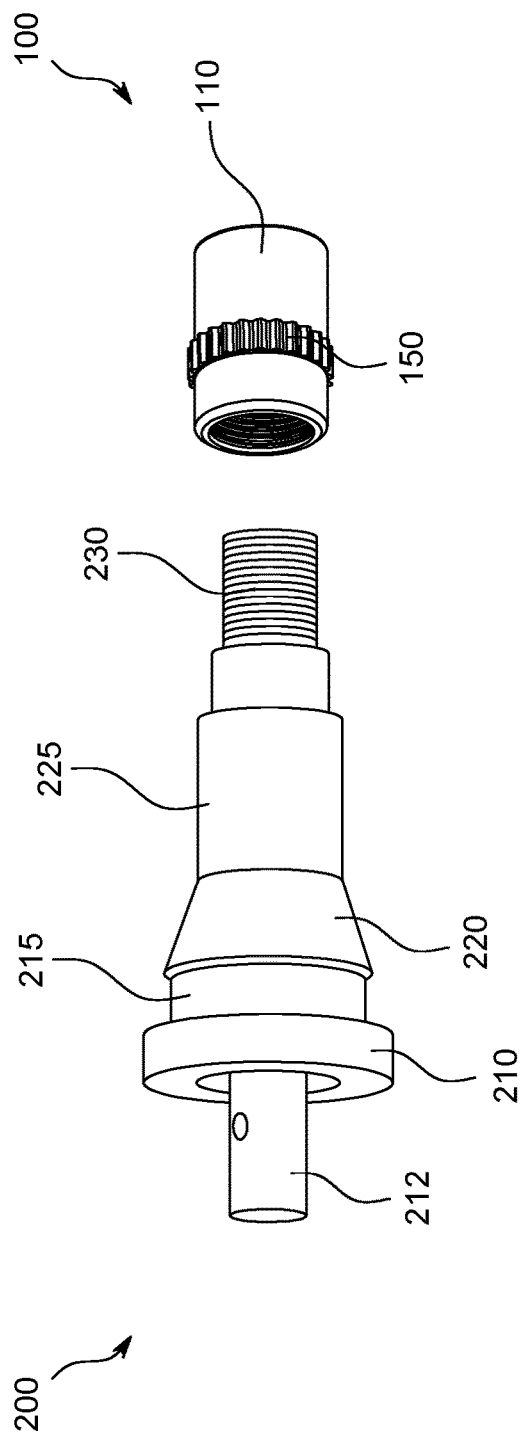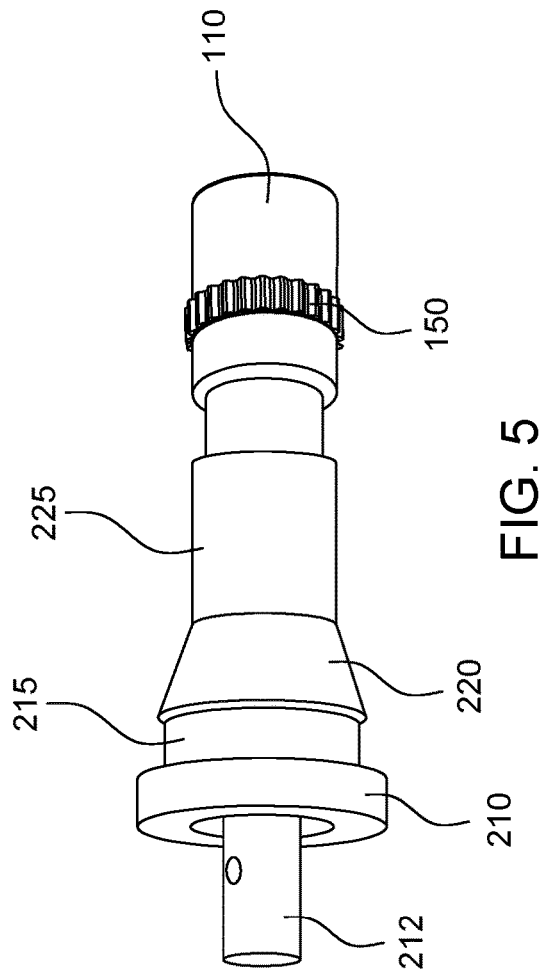
FIG. 4
FIG. 5

TIRE PRESSURE MONITOR CAP

BACKGROUND OF THE INVENTION

1. Field of the Invention

The present disclosure generally relates to tire pressure-monitoring devices. More particularly, the present disclosure relates to a tire pressure-monitoring cap coupled to a valve stem of a wheel of a vehicle, the tire pressure monitoring cap is used for monitoring tire pressure and notifying a user of the vehicle of the tire pressure.

2. Description of the Related Art

It is known that a valve stem is coupled to a tire or a wheel of a vehicle for administering air into the tire in order to inflate or to deflate the tire. The valve stem comprises a valve stem core, which facilitates in preventing air loss and keeps the dirt and debris from getting into the valve stem. It is known that after administering air, the valve stem automatically closes and keeps the pressure in the tire to prevent the air from escaping. Generally, the valve stem is provided with a valve stem cap used for closing the valve stem. The valve stem cap may be made up of plastic, metal or any other suitable material. The valve stem cap may be provided in variety shapes and sizes. When the valve stem cap is coupled to the valve stem, the valve stem cap allows keeping dirt and moisture out of the valve stem core.

Although the valve stem is capable of maintaining the pressure in the tire, the pressure in the tire may reduce due to various reasons such as puncture, loss of air pressure over a period of time and so on. Conventionally, a user of a vehicle has to manually check the pressure to determine whether the pressure is at required levels based on the type of the vehicle.

Several sensors or devices have been disclosed in the past, which are capable of monitoring and notifying the pressure in the tire. One such example is disclosed in a U.S. Pat. No. 6,817,235. In U.S. Pat. No. 6,817,235, it is disclosed that a tire pressure monitoring and reporting instrument is mounted within a valve stem and has a valve cap. A single circuit can be provided having an LED, a sounder, a battery and a switch. A dual stage system, or a continuously variable system can be implemented by using a dual stage pressure switch or a continuously variable pressure switch. The battery may be housed within the cap and electrical contacts between the cap and stem allow discontinuation of the circuit or changing of the battery.

Another example is disclosed in a U.S. Pat. No. 8,618,925. In U.S. Pat. No. 8,618,925, it is disclosed that a tire pressure monitoring using wireless network includes a remote command device and a valve-stem mountable tire pressure gauge. The tire pressure gauge includes a pressure sensor for detecting a pressure of a fluid in a tire and providing an output signal indicative of the detected fluid pressure, and a first radio-frequency module for transmitting data indicative of the detected fluid pressure based on the output signal of the pressure sensor. The remote command device includes a second radio-frequency module for wirelessly receiving the data transmitted by the data transmitted by the first radio frequency module, a wireless communication module for communicating via a wireless network, information based at least one data received by the second radio frequency module, and a display for displaying at least the fluid pressure detected by the pressure sensor.

Another example is disclosed in a United States patent application US20030217595. In US20030217595, a remote tire pressure monitoring system and method for installing the system are disclosed. The remote tire pressure monitoring system includes a pressure monitor, a tire valve assembly including a valve stem, a retention nut, and a plastic thin-walled valve cap which fits on an open end of the valve assembly. The outer diameter of the thin-walled valve cap is smaller than the inner diameter of the retention nut. As a result, the retention nut fits over the thin-walled valve cap. The tire pressure monitoring system is installed on a tire rim by threading the tire valve assembly with the valve cap in place through an opening in the tire rim and then passing the retention nut over the valve cap and tightening the retention nut onto the valve stem.

Although the above disclosures are effective in monitoring the tire pressure, they have several disadvantages. For instance, if there is any damage to the sensor, then the valve stem has to be removed from the tire and the sensor has to be replaced. This requires considerable time and effort. Further, the user has to constantly check if the pressure went below required levels so as to inflate the tires.

In order to overcome the above problems, one possible solution includes providing a pressure sensor in the valve stem cap. One such example is disclosed in a U.S. Pat. No. 9,242,517. In U.S. Pat. No. 9,242,517, it is disclosed that the utility model provides a tire pressure monitor cap utilizing colors to indicate tire pressure. The tire pressure monitor cap comprises a transparent cover, an alarm bolt, a spring, a floating seat, a rubber pad, a ventilating plate, a metal housing and a gasket; the rubber pad includes a circular protruding seat having a wall higher than that of the outside wall, and a circumferential depression therein, wherein the center is provided with the conical portion, an circular groove arranged outside the protruding seat to receive a hard O-ring inserted thereinto and facilitate inner wall of the O-ring integrated with outer wall of the protruding seat; the O-ring not only increases intensity of the outer wall of the rubber pad by its hard plastic material, but also decreases pressure from the flange of the transparent cover. Moreover, the lower half portion of the body of the transparent cover inserted into the hollow recess and the whole flange inserted into the locating notch are facilitated the metal housing integrated tightly with the transparent cover and prevented the rubber pad from moving.

Although the tire pressure monitor cap disclosed in U.S. Pat. No. 9,242,517 solves the problems discussed above, U.S. Pat. No. 9,242,517 too has few problems. For instance, when the pressure goes below the required levels, the user of the vehicle will only get to know the pressure levels when he physically looks at the markings number indicating the recommended tire pressure value. If the user misses the markings, then there might be a high risk that the user may drive the vehicle with less pressure in the tire.

Other documents describing the closest subject matter provide for a number of more or less complicated features that fail to solve the problem in an efficient and economical way. None of these patents suggest the novel features of the present invention. Specifically, none of the disclosures in the art disclose a tire pressure-monitoring cap or valve stem cap comprising a pressure sensor, the tire pressure-monitoring cap capable of monitoring tire pressure and notifying a user of the vehicle of the tire pressure.

Therefore, there is a need in the art for a tire pressure-monitoring cap or valve stem cap capable of monitoring tire pressure and notifying a user of a vehicle of the tire pressure.

SUMMARY OF THE INVENTION

It is one of the main objects of the present invention to provide a tire pressure monitor cap for monitoring and notifying tire pressure to an electronic device or a dashboard that avoids the drawbacks of the prior art.

It is one object of the present invention to provide a tire pressure monitor cap that is removably coupled to a valve stem assembly, the tire pressure monitor cap capable of monitoring and notifying tire pressure to an electronic device of a user or a dashboard provided in a vehicle.

It is one object of the present invention to provide a tire pressure monitor cap for monitoring and notifying tire pressure. The tire pressure monitor cap comprises a housing and a pressure gauge provided in the housing. The pressure gauge comprises a pressure sensor used for measuring air pressure. The tire pressure monitor cap comprises a microprocessor provided in the housing. The microprocessor is communicatively coupled to the pressure sensor. The tire pressure monitor cap comprises a transceiver communicatively coupled to the microprocessor. The tire pressure monitor cap is coupled to a valve stem assembly. The valve stem assembly is provided in a tire. The pressure sensor monitors tire pressure and communicates to the microprocessor. The microprocessor is configured to notify an electronic device or a dashboard via the transceiver when tire pressure reaches below a predetermined threshold value.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 illustrates the tire pressure monitor cap 100 aligned with a valve stem assembly 200, in accordance with one embodiment of the present disclosure.

FIG. 5 illustrates the tire pressure monitor cap 100 coupled to the valve stem assembly 200, in accordance with one embodiment of the present disclosure.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a tire pressure monitor cap for monitoring and notifying tire pressure. The tire pressure monitor cap comprises a housing and a pressure gauge provided in the housing. The pressure gauge comprises a pressure sensor used for measuring air pressure. The tire pressure monitor cap comprises a microprocessor provided in the housing. The microprocessor is communicatively coupled to the pressure sensor. The tire pressure monitor cap comprises a transceiver communicatively coupled to the microprocessor. The tire pressure monitor cap is coupled to a valve stem assembly. The valve stem assembly is provided in a tire. The pressure sensor monitors tire pressure and communicates to the microprocessor. The microprocessor is configured to notify an electronic device or a dashboard via the transceiver when tire pressure reaches below a predetermined threshold value.

Various features and embodiments of a tire pressure monitor cap for monitoring and notifying tire pressure are explained in conjunction with the description of FIGS. 1-6.

Figure 1:
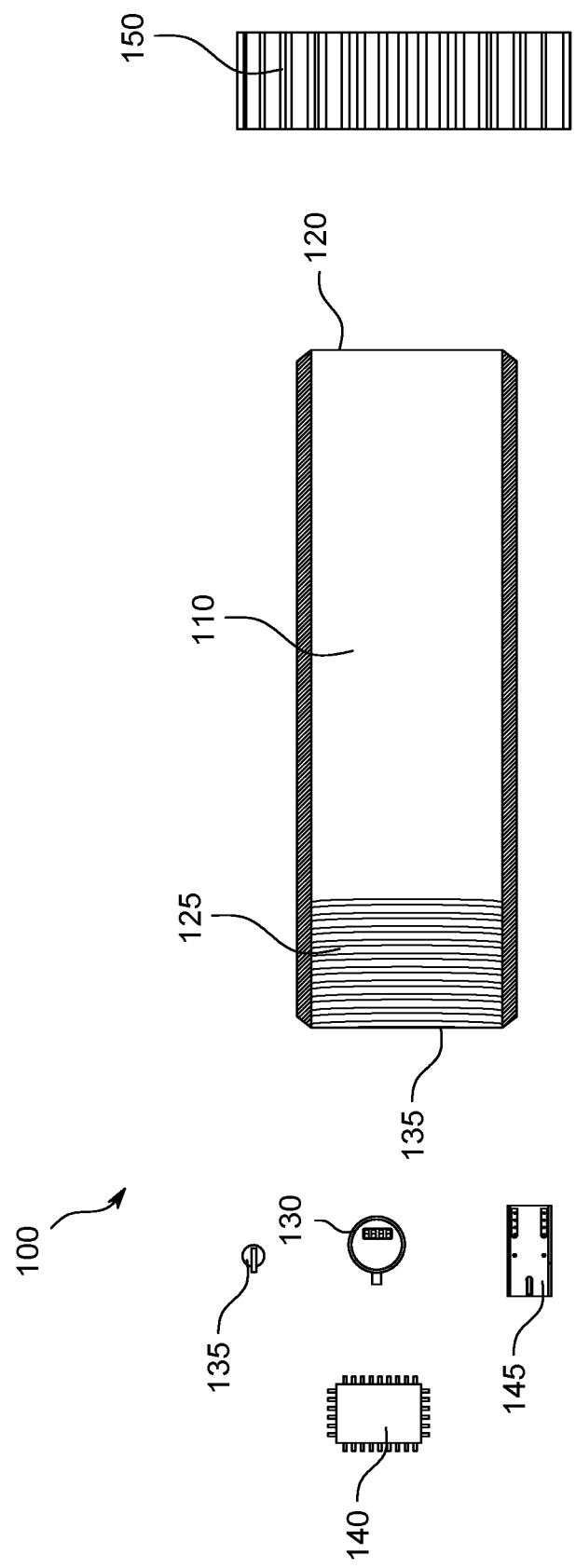
FIG. 1 illustrates an exploded view of a tire pressure monitor cap 100, in accordance with one embodiment of the present disclosure.

Referring to FIG. 1, an exploded view of a tire pressure monitor cap 100 is shown, in accordance with one embodiment of the present disclosure. The tire pressure monitor cap 100 comprises a housing 110. The housing 110 may be provided in a cylindrical or semi-circular shape. It should be understood that the housing 110 might be provided in any other shape. The housing 110 may be made up of metal or plastic or any other suitable material. The housing 110 comprises a first end 115 and a second end 120. It should be understood that the first end 115 is an open end and the second end 120 is a closed end. At the first end 115, the housing 110 comprises a threaded region 125 at inner side of the housing 110.

Further, the housing 110 comprises a pressure gauge 130. The pressure gauge 130 may comprise a pressure sensor 135. The pressure sensor 135 may include conventional sensors for detecting fluid pressure, and particularly air pressure. The pressure sensor 135 may be configured to provide acceptable response over a range of pressures anticipated in a particular application. In one example, the pressure sensor 135 may incorporate a MEMS based pressure die for detecting air pressure.

Further, the housing 110 comprises a microprocessor 140 and a transceiver 145. The microprocessor 140 may be implemented as one or more processors, microcomputers, digital signal processors, central processing units, state machines, logic circuitries, and/or any devices that manipulate signals based on operational instructions. Among other capabilities, the microprocessor 140 is configured to fetch and execute computer-readable instructions or program instructions stored in a memory (not shown). The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, and so on. In another example, the microprocessor 140 may store instructions that can be executed when called.

It should be understood that the microprocessor 140 is communicatively coupled to the pressure sensor 135. In one implementation, the microprocessor 140 may have an analog-to-digital converter (A/D) used for processing a digital signal indicative of the analog signal output from the pressure sensor 135.

The transceiver 145 is used to transmit and receive signal/data from the tire pressure monitor cap 100 to external devices such as servers or user devices such as electronic devices, a dashboard and so on.

In one exemplary implementation, the tire pressure monitor cap 100 may be provided with a battery (not shown) for providing power to the pressure sensor 135, the microprocessor 140, and the transceiver 145.

Further, the tire pressure monitor cap 100 comprises a grip 150 provided at outer part of the housing 110.

Figure 2:
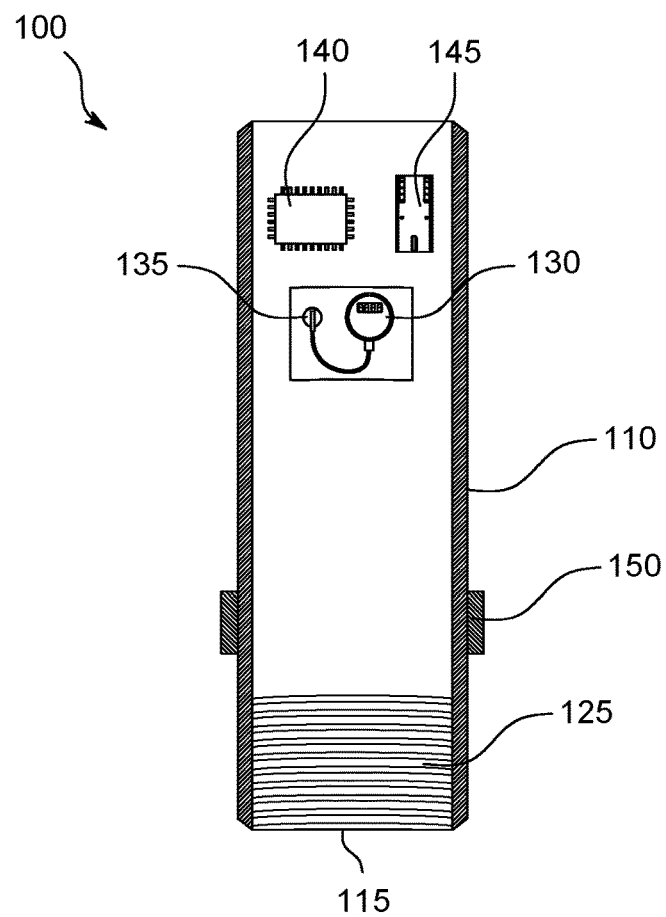
FIG. 2 illustrates a cross-sectional view of the tire pressure monitor cap 100, in accordance with one embodiment of the present disclosure.

Referring to FIG. 2, a cross-sectional view of the tire pressure monitor cap 100 is shown, in accordance with one embodiment of the present disclosure. As can be seen, the threaded region 125 is provided at inner side of the housing 110. Further, the pressure gauge 130 comprising the pressure sensor 135 is received in the housing 110. Further, the microprocessor 140 and the transceiver 145 are provided in housing 110.

Figure 3:
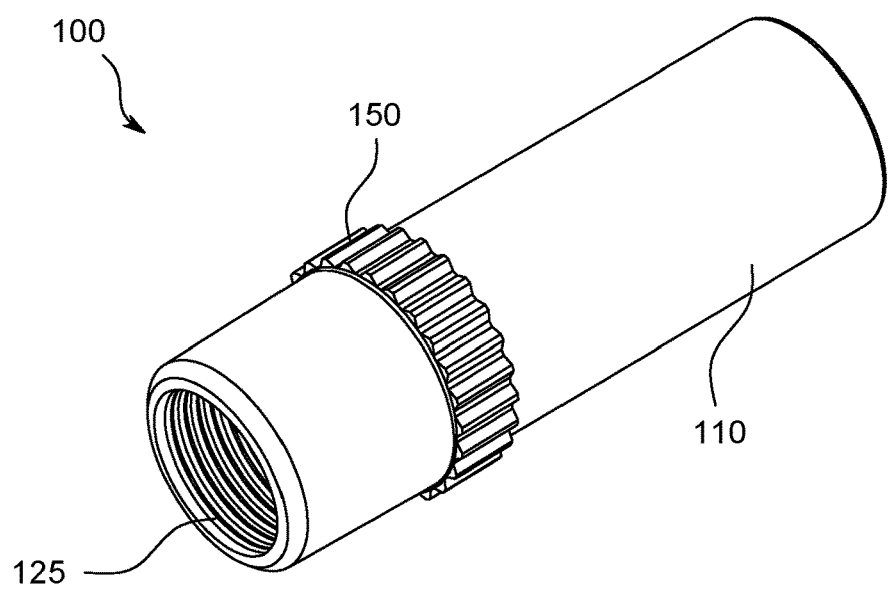
FIG. 3 illustrates a perspective view of the tire pressure monitor cap 100, in accordance with one embodiment of the present disclosure.

Now, referring to FIG. 3, a perspective view of the tire pressure monitor cap 100 is shown, in accordance with one embodiment of the present disclosure. As can be seen, the threaded region 125 is provided at inner side of the housing 110 is shown.

Referring to FIG. 4 and FIG. 5 the tire pressure monitor cap 100 coupled to a valve stem assembly 200 is explained. FIG. 4 shows the tire pressure monitor cap 100 provided in line with the valve stem assembly 200. As known, the valve stem assembly 200 comprises an attachment end 210. The attachment end 210 comprises an in-tire portion 212. The attachment end 210 is coupled to a flange 220 via a neck 115. Further, the valve stem assembly 200 comprises a valve stem body 225 having a threaded region 230 at the end. The valve stem assembly 200 may comprise a valve stem core (not shown) inside the valve stem body 225.

As known, a valve stem cap i.e., the tire pressure monitor cap 100 is used to close the valve stem assembly 200. Specifically, the tire pressure monitor cap 100 is used to close the open end of the valve stem assembly 200 to prevent air loss and to keep the dirt and debris from getting into the valve stem core or the valve step body 225. In accordance with one embodiment of the present disclosure, the tire pressure monitor cap 100 is coupled to the valve stem assembly 200 as shown in FIG. 5. In order to couple to the tire pressure, monitor cap 100 to the valve stem assembly 200, at first, the tire pressure monitor cap 100 may be held with the help of the grip 150 and the first end 115 of the tire pressure monitor cap 100 may be placed over the threaded region 230 of the valve stem assembly 200. Subsequently, the tire pressure monitor cap 100 may be rotated to couple the tire pressure monitor cap 100 to the valve stem assembly 200.

In accordance with one embodiment of the present disclosure, the tire pressure monitor cap 100 may be used to monitor tire pressure. As known, the valve stem assembly 200 may be provided at a tire of a vehicle. The valve stem assembly 200 may be used to administer air into the tire keep the pressure in the tire. As specified above, the tire pressure monitor cap 100 may be coupled to the valve stem assembly 200. As such, when the tire pressure monitor cap 100 is coupled to the valve stem assembly 200, the tire pressure monitor cap 100 may monitor the tire pressure.

In order to monitor the tire pressure, the pressure sensor 135 may be used. It should be understood that the pressure sensor 135 may periodically or continuously record values corresponding to the tire pressure and send the values to the microprocessor 140. In one implementation, the microprocessor 140 may be configured to determine a threshold value for the tire pressure. The threshold value may indicate that the pressure defined at various levels that are suitable to operate the tire. Based on the values received at the microprocessor 140, if the pressure is at or below a predefined threshold value, then the microprocessor 140 may signal the transceiver 145 to notify or alert a user of the wheel. In should be understood that the predefined threshold value may indicate the air pressure that is optimum to operate the tire. If the air pressure is below the predefined threshold value, then it is considered that it is not safe to operate or sue the tire as it may damage the tire or reduce the life of tire if used below the predefined threshold value.

If the microprocessor 140 detects that the air pressure in the tire is below the predefined threshold value, then the microprocessor 140 may employ the transceiver 145 to notify a user of the vehicle. For example, the transceiver 145 may be communicatively coupled to an electronic device or to a dashboard of the vehicle so that when the user receives the notification from the tire pressure monitor cap 100 indicating that the air pressure in the tire is below the predefined threshold value, then the user can take necessary action.

Figure 6:
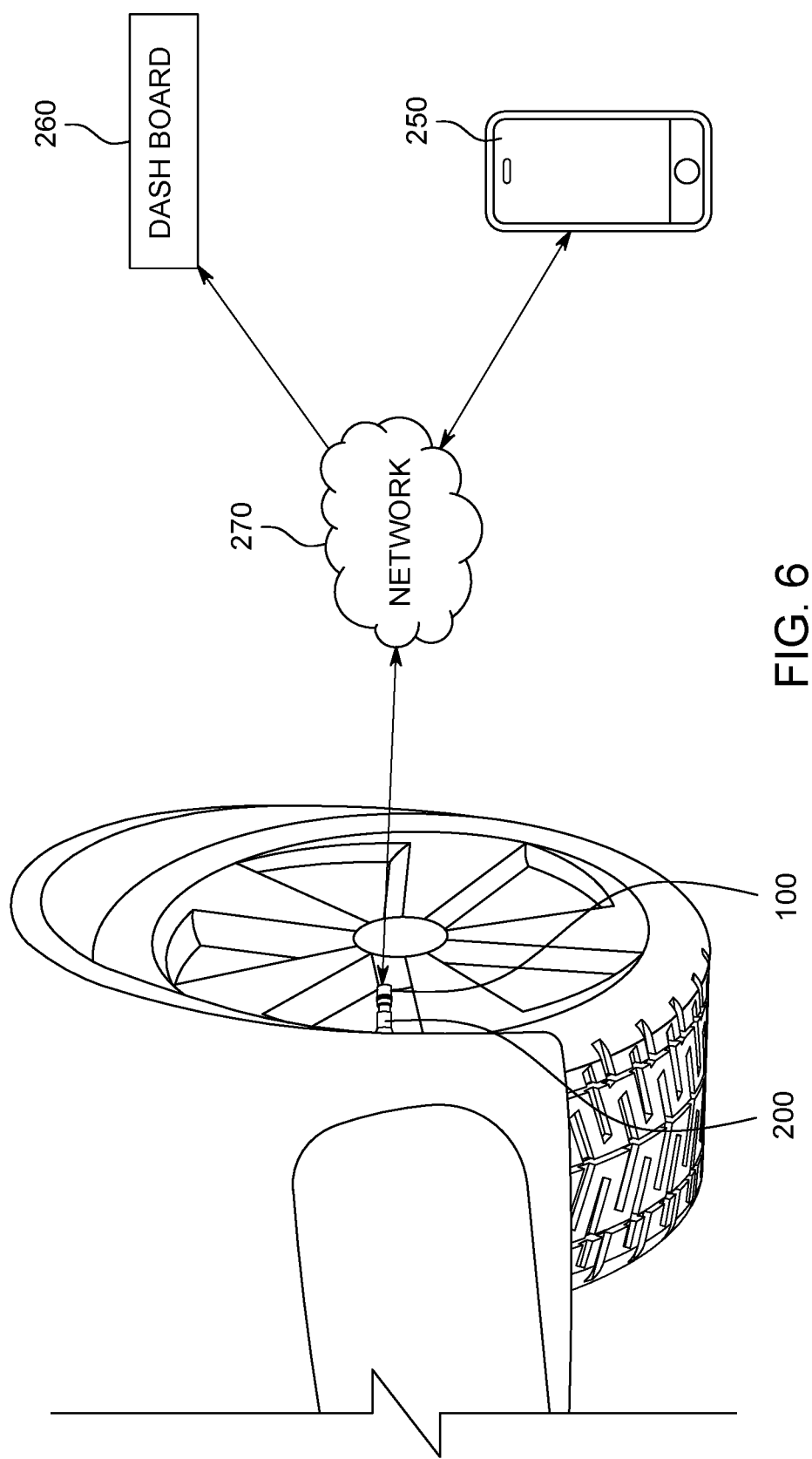
FIG. 6 illustrates an environment in which the valve stem assembly 200 is coupled to a tire T, and the tire pressure monitor cap 100 is communicatively coupled to an electronic device 250 and/or a dashboard, in accordance with one exemplary embodiment of the present disclosure.

Referring to FIG. 6, an environment in which the valve stem assembly 200 coupled to a wheel or tire T is shown. It should be understood that the tire pressure monitor cap 100 might be coupled to the valve stem assembly 200. In order to send notification corresponding to the tire pressure sensed by the pressure sensor 135, the tire pressure monitor cap 100 may be communicatively coupled to electronic device 250 or a dashboard 260 of a vehicle (not shown) via a network 270.

It should be understood that the electronic device 250 may include, but not limited to, a mobile phone, a laptop, a tablet, a smart watch and so on. The electronic device 250 may comprise a processor (not shown), a memory (not shown), an input/output interface (not shown), and a transceiver (not shown). Further, the electronic device 250 may comprise software or an application to interact with the tire pressure monitor cap 100.

As known, the dashboard 260 may be provided in the vehicle. The dashboard 260 may have a system (not shown) that can communicate with the tire pressure monitor cap 100 and display the notifications received from the tire pressure monitor cap 100.

The network 270 may include wired or wireless network, including but not limited, to Bluetooth, cellular Network, Near Field Communication, Wi-Fi, ZigBee and other known communication mechanisms.

Whenever the pressure in the tire T goes below the predefined threshold value, then the microprocessor 140 may send the notification to one of the electronic device 250 and the dashboard 260 via the transceiver 145. After receiving the notification, the user of the vehicle may take appropriate action. For instance, if the pressure in tire goes below the predefined threshold value, then the user may drive the vehicle to garage or gas station to inflate the tire T.

Further, in case the tire T is flat, then the user may get the notification immediately such that the user may stop the vehicle thereby preventing further damage to the tire T.

In an alternate embodiment, the user may query or request or check the tire pressure using the electronic device 250. In order to check the tire pressure, the user may launch the software or application residing in the electronic device 250. Subsequently, the user may send the query to the transceiver 145 of the tire pressure monitor cap 100. The transceiver 145 may send the query to the microprocessor 140. After receiving the query, the microprocessor 140 may send the readings corresponding to pressure obtained using the pressure sensor 135 to the electronic device 250 via the transceiver 145.

Based on the above, it is evident that the tire pressure monitor cap 100 may be used to monitor/measure tire pressure and communicate the notification comprising values of the pressure to the electronic device 250 or the dashboard 260. Upon receiving the notification, the user may take appropriate action. As such, the user will be able to obtain values of the tire pressure and prevent the tire T from blowing or unexpected flat tire. Further, the life of the tire T can be extended and unexpected flats can be reduced.

It should be understood that the tire pressure monitor cap can be fitted to tires of any vehicle such as car, truck, bus, bicycle, motorcycle and so on. As such, the tire pressure monitor cap can be interchangeably used with tire of any vehicle as the user may wish.

It is understood that the tire pressure monitor cap can be provided in different shapes and sizes and can be made up of different materials. As such, it is obvious to a person skilled in the art to incorporate the features described herein in conventional tire pressure monitor cap such as valve step caps to monitor and notify the user of the tire pressure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tire pressure monitor cap for monitoring and notifying tire pressure, the tire pressure monitor cap comprising:
    a housing having a uniform cylindrical shape with a first end and a second end, wherein said first end is an open end, wherein said second end is a closed end, wherein said housing further includes an outer surface having a grip mounted thereon, wherein said grip is cylindrical in shape and having a height that is less than a height of said housing;
    a pressure gauge provided in the housing, wherein the pressure gauge comprises a pressure sensor used for measuring air pressure;
    a microprocessor provided in the housing, wherein the microprocessor is communicatively coupled to the pressure sensor; and
    a transceiver communicatively coupled to the microprocessor,
    wherein the tire pressure monitor cap is coupled to a valve stem assembly, wherein the valve stem assembly is provided in a tire, wherein the pressure sensor monitors tire pressure and communicates to the microprocessor, wherein the microprocessor is configured to notify a user via the transceiver when tire pressure reaches below a predetermined threshold value;
    wherein said valve stem assembly includes an attachment end being a cylindrical structure, an in-tire portion extending downwardly from said attachment end adapted to be attached to said tire, wherein said attachment end is coupled to a flange through a neck located between said attachment end and said flange, said valve stem assembly further including a valve stem body having a threaded region at a top end, wherein said threaded region of said valve stem body is inserted within said first end of said housing.

2. The tire pressure monitor cap of claim 1, wherein the microprocessor notifies the pressure value to an electronic device or a dashboard.

3. The tire pressure monitor cap of claim 2, wherein the microprocessor transmits the notification to the electronic device or the dashboard via the transceiver.

4. The tire pressure monitor cap of claim 1, wherein the tire pressure monitor cap comprises a threaded region used to couple the tire pressure monitor cap to the valve stem assembly.

5. The tire pressure monitor cap of claim 1, wherein said pressure sensor includes an MEMS based pressure die.

6. The tire pressure monitor cap of claim 1, wherein said microprocessor is in wireless communication with a network.

7. The tire pressure monitor cap of claim 6, wherein said network is a Cellular Network.

8. The tire pressure monitor cap of claim 6, wherein said network is a Bluetooth network.

9. The tire pressure monitor cap of claim 6, wherein said network is a Wi-Fi network.

10. A tire pressure monitor cap for monitoring and notifying tire pressure, consisting of:
    a housing having a uniform cylindrical shape with an first end and a second end, wherein said first end is an open end, wherein said second end is a closed end, said housing further including an inner portion and an outer portion wherein said inner portion of said first end includes inner threading;
    a pressure gauge provided in the second end of the housing, wherein the pressure gauge comprises a pressure sensor used for measuring air pressure;
    a microprocessor provided in the second end of the housing, wherein the microprocessor is communicatively coupled to the pressure sensor; and
    a transceiver communicatively coupled to the microprocessor,
    wherein the tire pressure monitor cap is coupled to a valve stem assembly, wherein the valve stem assembly is provided in a tire, wherein the pressure sensor monitors tire pressure and communicates to the microprocessor, wherein said microprocessor is in wireless communication with a network, wherein said network is a wireless network selected from a group consisting essentially of Bluetooth, Cellular Network, Near Field Communication, or Wi-Fi, wherein the microprocessor notifies an electronic device or a dashboard via the transceiver when tire pressure reaches below a predetermined threshold value;
    wherein said valve stem assembly includes an attachment end being a cylindrical structure, an in-tire portion extending downwardly from said attachment end adapted to be attached to said tire, wherein said attachment end is coupled to a flange through a neck located between said attachment end and said flange, said valve stem assembly further including a valve stem body having a threaded region at a top end, wherein said threaded region of said valve stem body is inserted within said first end of said housing.

11. A system for a tire pressure monitor cap for monitoring and notifying pressure, consisting of:
    a housing having a uniform cylindrical shape with an first end and a second end, wherein said first end is an open end, wherein said second end is a closed end, said housing further including an inner portion and an outer portion wherein said inner portion of said first end includes inner threading;
    a pressure gauge provided in the second end of the housing, wherein the pressure gauge comprises a pressure sensor used for measuring air pressure;

a microprocessor provided in the second end of the housing, wherein the microprocessor is communicatively coupled to the pressure sensor; and a transceiver communicatively coupled to the microprocessor, a vehicle having a dashboard, a tire coupled to said vehicle, a wireless network selected from a group consisting essentially of Bluetooth, Cellular Network, Near Field Communication, or Wi-Fi, wherein the tire pressure monitor cap is coupled to a valve stem assembly, wherein the valve stem assembly is provided in said tire, wherein the pressure sensor monitors tire pressure and communicates to the microprocessor, wherein said microprocessor is in wireless communication with said network, wherein the microprocessor notifies an electronic device or said dashboard via the transceiver when tire pressure reaches below a predetermined threshold value;

wherein said valve stem assembly includes an attachment end being a cylindrical structure, an in-tire portion extending downwardly from said attachment end adapted to be attached to said tire, wherein said attachment end is coupled to a flange through a neck located between said attachment end and said flange, said valve stem assembly further including a valve stem body having a threaded region at a top end, wherein said threaded region of said valve stem body is inserted within said first end of said housing.

* * * * *